(12) United States Patent
Li et al.

(10) Patent No.: US 11,002,840 B2
(45) Date of Patent: May 11, 2021

(54) MULTI-SENSOR CALIBRATION METHOD, MULTI-SENSOR CALIBRATION DEVICE, COMPUTER DEVICE, MEDIUM AND VEHICLE

(71) Applicant: BAIDU ONLINE NETWORK TECHNOLOGY (BEIJING) CO., LTD., Beijing (CN)

(72) Inventors: Shirui Li, Beijing (CN); Yuanfan Xie, Beijing (CN); Xun Zhou, Beijing (CN); Liang Wang, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 0 days.

(21) Appl. No.: 16/574,700

(22) Filed: Sep. 18, 2019

(65) Prior Publication Data
US 2020/0088858 A1 Mar. 19, 2020

(30) Foreign Application Priority Data
Sep. 19, 2018 (CN) .......................... 201811094375.3

(51) Int. Cl.
*G01S 7/497* (2006.01)
*G06T 7/80* (2017.01)
(Continued)

(52) U.S. Cl.
CPC ............ *G01S 7/497* (2013.01); *G01S 7/4808* (2013.01); *G01S 17/58* (2013.01); *G06T 7/70* (2017.01); *G06T 7/80* (2017.01)

(58) Field of Classification Search
CPC ........ G01S 7/497; G01S 7/4808; G01S 17/58; G06T 7/80; G06T 7/70
See application file for complete search history.

(56) References Cited

U.S. PATENT DOCUMENTS

| | | | |
|---|---|---|---|
| 2014/0267608 A1* | 9/2014 | Dhome ..................... | G06T 7/80 348/43 |
| 2014/0368651 A1* | 12/2014 | Irschara .................... | G06T 7/80 348/148 |

(Continued)

FOREIGN PATENT DOCUMENTS

| | | |
|---|---|---|
| CN | 104142157 A | 11/2014 |
| CN | 107505644 A | 12/2017 |

(Continued)

OTHER PUBLICATIONS

European Patent Application No. 19198120.8 extended Search and Opinion dated Feb. 13, 2020, 6 pages.

(Continued)

*Primary Examiner* — Dominic J Bologna
(74) *Attorney, Agent, or Firm* — Lathrop GPM LLP

(57) ABSTRACT

Embodiments of the present disclosure provide a multi-sensor calibration method, a multi-sensor calibration device, a computer device, a medium and a vehicle. The method includes: acquiring data acquired by each of at least three sensors in a same time period in a traveling process of a vehicle; determining a trajectory of each of the at least three sensors according to the data acquired by each of at least three sensors; and performing a joint calibration on the at least three sensors by performing trajectory alignment on the trajectories of the at least three sensors.

12 Claims, 3 Drawing Sheets

(51) Int. Cl.
  *G06T 7/70*   (2017.01)
  *G01S 7/48*   (2006.01)
  *G01S 17/58*  (2006.01)

(56) References Cited

U.S. PATENT DOCUMENTS

2016/0070981 A1* 3/2016 Sasaki ............... G01S 17/42
                                                 348/148
2020/0304737 A1* 9/2020 Sakano ............... H04N 5/225

FOREIGN PATENT DOCUMENTS

| CN | 107608371 A | 1/2018 |
| CN | 108020826 A | 5/2018 |
| EP | 1521059 A1  | 4/2005 |
| GB | 2507560 A   | 5/2014 |
| JP | 2015501471 A | 1/2015 |
| JP | 2016057108 A | 4/2016 |
| JP | 2017139600 A | 8/2017 |

OTHER PUBLICATIONS

Chinese Patent Application No. 201811094375.3 Office Action dated May 6, 2020, 6 pages.
Chinese Patent Application No. 201811094375.3 English translation of Office Action dated May 6, 2020, 8 pages.
Japanese Patent Application No. 2019-167404 Office Action dated Sep. 15, 2020, 4 pages.
Japanese Patent Application No. 2019-167404 English translation of Office Action dated Sep. 15, 2020, 4 pages.

* cited by examiner

MULTI-SENSOR CALIBRATION METHOD, MULTI-SENSOR CALIBRATION DEVICE, COMPUTER DEVICE, MEDIUM AND VEHICLE

CROSS-REFERENCE TO RELATED APPLICATIONS

This application claims priority to and benefit of Chinese Patent Application No. 201811094375.3, filed with the National Intellectual Property Administration of P. R. China on Sep. 19, 2018, the entire contents of which are incorporated herein by reference.

TECHNICAL FIELD

The present disclosure relates to the field of computer technologies, and more particularly, to a multi-sensor calibration method, a multi-sensor calibration device, a computer device, a medium and a vehicle.

BACKGROUND

Unmanned driving systems include a plurality of sensors, such as long-range radar, lidar, short-range radar, camera, ultrasound apparatus, GPS, and gyroscope, and the control module of the vehicle can issue precise commands based on these sensors. The calibration of the sensor can directly affect the accuracy of the sensor data, and the calibration of the sensor is a non-negligible link in the application process.

SUMMARY

Embodiments of an aspect of the present disclosure provide a multi-sensor calibration method. The method includes: acquiring data acquired by each of at least three sensors in a same time period in a traveling process of a vehicle; determining a trajectory of each of the at least three sensors according to the data acquired by each of at least three sensors; and performing a joint calibration on the at least three sensors by performing trajectory alignment on the trajectories of the at least three sensors.

Embodiments of another aspect of the present disclosure provide a computer device. The computer device includes one or more processors, and a storage device configured to store one or more programs. When the one or more programs are executed by the one or more processors, the one or more processors are caused to implement the multi-sensor calibration method according to any embodiment of the present disclosure.

Embodiments of another aspect of the present disclosure provide a computer readable storage medium having stored thereon a computer program that, when executed by a processor, causes the multi-sensor calibration method according to any embodiment of the present disclosure to be implemented.

Embodiments of yet another aspect of the present disclosure provide a vehicle. The vehicle includes a vehicle body, a computer device according to an embodiment of the present disclosure, and at least three sensors disposed on the vehicle body. The at least three sensors include at least two of a lidar, a camera, and a positioning device, the at least three sensors communicate with the computer device.

DETAILED DESCRIPTION

The present disclosure will be described in detail below with reference to the accompanying drawings and the embodiments. Embodiments described herein with reference to drawings are explanatory, serve to explain the present disclosure, and are not construed to limit the present disclosure. In addition, it should also be noted that, for convenience of description, only part but not all structures related to the present disclosure are illustrated in the accompanying drawings.

Recently, in the calibration process between the lidar, GPS/IMU (Inertial Measurement Unit) and the camera, the calibration process merely involves two sensors, such as the lidar and GPS/IMU, or the camera and the lidar, the operation process is complicated and time consuming, and the calibration accuracy is limited.

Embodiment 1

Figure 1:
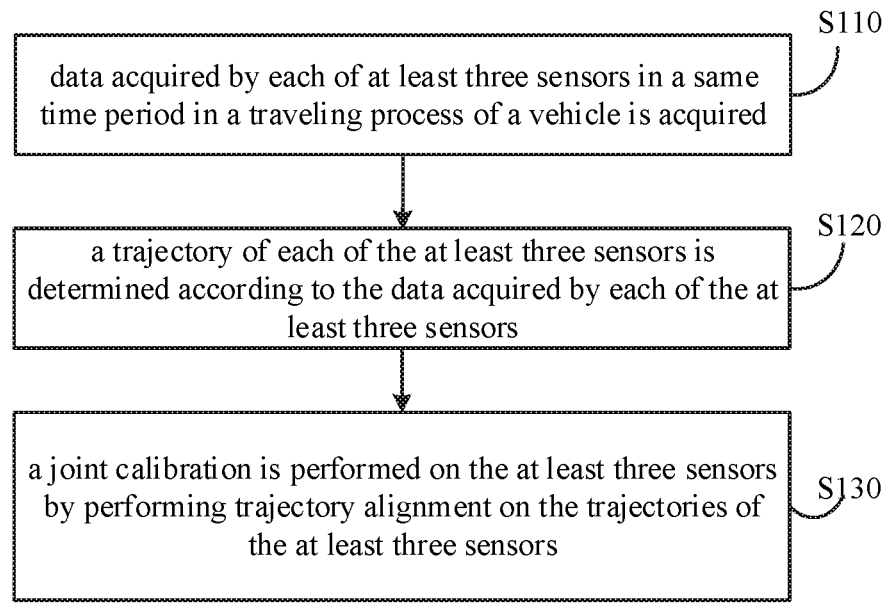
FIG. 1 is a flow chart of a multi-sensor calibration method according to Embodiment 1 of the present disclosure.

FIG. 1 is a flow chart of a multi-sensor calibration method according to Embodiment 1 of the present disclosure. The embodiment may be applicable to the case of calibrating a plurality of sensors simultaneously, the method may be performed by a multi-sensor calibration device, which can be implemented by means of software and/or hardware, and can be integrated on a computer device. The computer device may be configured on a vehicle, such as an unmanned vehicle with control and computing capabilities. As shown in FIG. 1, the method may include the following operations.

At block S110, data acquired by each of at least three sensors in a same time period in a traveling process of a vehicle is acquired.

The at least three sensors may include at least one type of sensor, and the number of sensors is greater than or equal to the number of types of the sensors. For example, for three sensors, they may have distinct three types, two types, or one type with different versions. For sensors A, B, C, their types may be different, sensor A may be a lidar, sensor B may be a positioning device, and sensor C may be a camera. Alternatively, the types of sensors A and B may be the same, and are different from the type of sensor C, for example, the sensors A and B may be a lidar, and the sensor C may be a camera or a positioning device. Alternatively, the types of sensors A, B and C may be the same, for example, the sensors A, B and C may be a lidar/positioning device/camera with different versions. The number of sensors in each type is not limited in the embodiment, and may be determined according to the sensor configuration of the vehicle.

In the same time period during traveling of the vehicle, data acquired by the plurality of sensors may be acquired, such that the advantages of different sensors can be complemented, the amount of source information available in the sensor calibration process can be increased, and the calibration accuracy can be improved.

At block S120, a trajectory of each of the at least three sensors is determined according to the data acquired by each of the at least three sensors.

The trajectory of the sensor is determined based on the data it acquires. The determination of the trajectory may be related to the type of the sensor. For example, when the sensor is a camera, the trajectory of the camera may be determined based on image recognition technology. When the sensor is a lidar, the trajectory of the lidar may be determined by constructing a three-dimensional (3D) scene based on laser point cloud it acquires. When the sensor is a positioning device, such as GPS, IMU, and encoder, the trajectory of the positioning device may be determined based on the positioning trajectory it determines during traveling of the vehicle. For the sensors configured to sense surrounding objects, such as the camera and lidar, the trajectory of the sensor may refer to a moving trajectory of the same object in the surrounding environment data acquired by the sensor.

In addition, the trajectories of the plurality of sensors may be determined based on machine learning and by using a pre-trained trajectory determination model, such as a camera trajectory determination model, a lidar trajectory determination model, and a positioning device trajectory determination model.

At block S130, a joint calibration is performed on the at least three sensors by performing trajectory alignment on the trajectories of the at least three sensors.

The vehicle may be equipped with a plurality of sensors, and each of which may be installed at different positions of the vehicle. As the traveling of the vehicle, the data acquired by different sensors is relative to their own coordinate system, and the obtained trajectories of the different sensors may correspond to different coordinate systems. The trajectory shapes of different sensors may be related to the driving state of the vehicle, and have similarities. Based on coordinate transformation, and by transformation operations such as rotation and translation between trajectories in different coordinate systems, the alignment of different trajectories can be achieved, i.e., the simultaneous coincidence of the plurality of trajectories. In this case, the coordinate transformation parameters between different trajectories may be extracted, and joint calibration of the plurality of sensors can be achieved.

In the embodiment, in the process of joint calibration, the trajectory data of at least three sensors may be used to solve the coordinate transformation parameters between different sensors based on a constraint equation, compared with the related art that data acquired by merely two sensors is used to solve the coordinate transformation parameters, the embodiment has high resolution conditions for parameters in the calibration process, and the calibration accuracy is higher. Moreover, in the embodiment, the trajectories of the plurality of sensors are simultaneously aligned, instead of sequentially aligning the trajectories of two of the plurality of sensors, such that the calibration process for calibrating the plurality of sensors can be simplified, and the number of repeated calibration operations can be reduced, the calculation pressure of the computer device can be alleviated. Furthermore, in the embodiment, the error accumulation introduced by calibration of two of the plurality of sensors can be avoided, and the calibration accuracy can be improved.

In at least one embodiment, performing the joint calibration on the at least three sensors by performing trajectory alignment on the trajectories of the at least three sensors includes: selecting one from the trajectories of the at least three sensors as a target trajectory, and taking remaining trajectories as object trajectories; performing trajectory alignment of each of the object trajectories and the target trajectory, and determining an extrinsic parameter of each of the at least three sensors in response to determining that each of the object trajectories is aligned with the target trajectory.

After the target trajectory is determined, the coordinate system of the target trajectory may be taken as a reference coordinate system, and the remaining object trajectories may be transformed from their current coordinate systems to the reference coordinate system, so as to be aligned with the target trajectory. When each of the object trajectories is aligned with the target trajectory, the coordinate transformation parameters between different trajectories can be determined, and the extrinsic calibration parameters (including a rotation matrix, and a translation vector) of each of the plurality of sensors can be determined.

With the technical solution of the embodiment of the present disclosure, by acquiring data acquired by each of at least three sensors in the same time period in the traveling process of the vehicle, the trajectory of each of the at least three sensors can be determined according to the data acquired by each of at least three sensors, and the joint calibration of the at least three sensors can be achieved by performing trajectory alignment on the trajectories of the at least three sensors. Thereby, the sensors are calibrated based on the data acquired by the plurality of sensors, which can maximize the utilization of multi-source information acquired, improve the precision of the sensor calibration, and simplify the calibration process of calibrating the plurality of sensors, and avoid the error accumulation introduced by calibration of two of the plurality of sensors.

Embodiment 2

Figure 2:
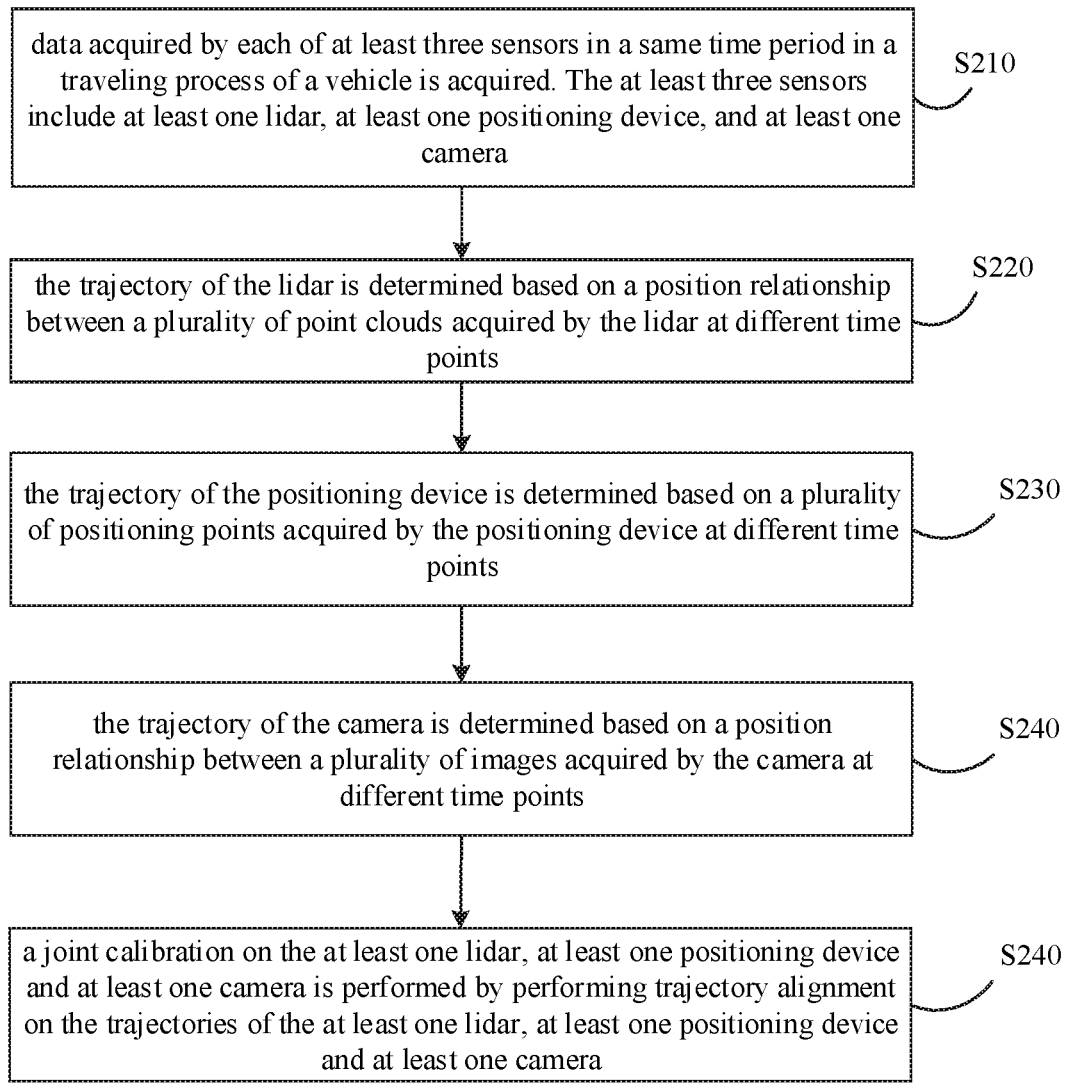
FIG. 2 is a flow chart of a multi-sensor calibration method according to Embodiment 2 of the present disclosure.

FIG. 2 is a flow chart of a multi-sensor calibration method according to Embodiment 2 of the present disclosure. The embodiment is on the basis of the above embodiments. As shown in FIG. 2, the method may include the following operations.

At block S210, data acquired by each of at least three sensors in a same time period in a traveling process of a vehicle is acquired. The at least three sensors include at least one lidar, at least one positioning device, and at least one camera.

In the embodiment, the sensors such as the lidar, the positioning device, and the camera are taken as an example to describe the joint calibration of the plurality of sensors. It should be noted, other types of sensors may also be included, which is not limited in the embodiment.

At block S220, the trajectory of the lidar is determined based on a position relationship between a plurality of point clouds acquired by the lidar at different time points.

The point cloud data acquired by the lidar at different consecutive time points may include point cloud data of the same area or the same object, the spatial position points of the same area or the same object in the point cloud data can be determined, and can be correlated according to the time relationship, such that the change trajectory of these spatial position points can be obtained, and the trajectory of the lidar can be obtained. Then, in a similar manner, the trajectories of a plurality of lidars can be determined.

In at least one embodiment, determining the trajectory of the lidar may include: analyzing the plurality of point clouds acquired by the lidar at different time points; performing feature extraction on the plurality of point clouds; determining a position relationship between every two of the plurality of point clouds by feature alignment; and determining the trajectory of the lidar based on the position relationship.

Specifically, the point clouds acquired at different time points may be analyzed to recognize the same area or the same object included in the different point clouds, features such as the edge contour or representative feature points of the same area or the same object in different point clouds may be extracted. Then, according to time continuity, alignment of features in the point clouds acquired at two adjacent time points may be performed, and position variation amount (such as displacement) between features of the same area or the same object in two adjacent point clouds can be determined. The position variation amount of the features is the position variation amount of the point clouds at different time points. The adjacent point clouds may refer to two point clouds having a coincident area and the distance between the corresponding spatial coordinate points in the coincident area being less than or equal to a point cloud distance threshold in different point clouds. The point cloud distance threshold may be set adaptively. According to time continuity, the position variation amounts of different point clouds may be correlated, and the trajectory of the lidar can be determined.

For example, in the point clouds acquired by the lidar, the coordinate of a feature point B of an object at time point A1 is B1(x1, y1, z1), and the coordinate of the feature point B of the object at the nearest adjacent time point A2 is B2(x2, y2, z2). Then, by coordinate alignment, the coordinate variation amount of the feature point B from B1(x1, y1, z1) to B2(x2, y2, z2) can be determined, and the position variation amount between the point clouds acquired at time point A1 and time point A2 can be determined. In a similar manner, the position variation between every two of the plurality of point clouds can be determined, and the trajectory of the lidar can be determined, such that the trajectories of a plurality of lidars can be determined At block S230, the trajectory of the positioning device is determined based on a plurality of positioning points acquired by the positioning device at different time points.

The positioning device may include GPS, IMU, and Encoder, etc., and the trajectory of the vehicle (also the trajectory of the positioning device) can be determined by using the positioning function of the positioning device.

At block S240, the trajectory of the camera is determined based on a position relationship between a plurality of images acquired by the camera at different time points.

The image data acquired by the camera at different consecutive time points may include image data of the same area or the same object, and the spatial position points of the same area or the same object in the image data can be determined, and can be correlated according to the time relationship, such that the change trajectory of these spatial position points can be obtained, and the trajectory of the camera can be obtained. Then, in a similar manner, the trajectories of a plurality of cameras can be determined.

In at least one embodiment, determining the trajectory of the camera may include: analyzing the plurality of images acquired by the camera at different time points, and obtaining a plurality of feature points on each of the plurality of images; determining a coordinate of each of the plurality of feature points in a camera coordinate system; determining a position relationship between every two of the plurality of images by feature point alignment; and determining the trajectory of the camera according to the position relationship.

Specifically, by image recognition, in each of the images acquired at adjacent time points, an area with the pixel variation value greater than a pixel threshold may be determined as a target area. The images acquired at adjacent time points may refer to two images in which the vector distance of the target areas of the two images in the camera coordinate system in different images is less than or equal to a vector distance threshold. The pixel threshold and the vector distance threshold may be set adaptively. Then, in the target areas of the images acquired at different time points, corresponding corner points may be selected and taken as feature points of the image, and the coordinates of the feature points in the current camera coordinate system can be determined, and alignment may be performed on the coordinates of the feature points of the images acquired at adjacent time points, to determine the coordinate variation amount between the feature points (i.e., the position variation amount of images acquired at adjacent time points). The corner points in the target areas of different images may correspond to the same object, such that the determination process of the trajectory may be referenced. Finally, according to the time correlation, the position variation between the images acquired at different time points can be correlated, and the trajectory of the camera can be obtained.

In at least one embodiment, in the process of determining the trajectory of the camera, the images acquired at the adjacent time points may be verified. Specifically, after the target area is determined according to the pixel variation, the position vector of the target area in the current image coordinate system can be determined, and be converted to a camera coordinate system according to a transformation relationship between the current image coordinate system and the camera coordinate system, and then a vector distance of the position vectors of the target areas in the two images in the camera coordinate system can be calculated, when the vector distance is less than or equal to the vector distance threshold, it can be determined that the two images are acquired at the adjacent time points.

It should be noted that, the execution orders of blocks S220 to S240 are not limited, and the process of determining the trajectories of the lidar, the camera, and the positioning device described above is merely an example, and should not be taken as a limitation on the embodiment.

At block S250, a joint calibration on the at least one lidar, at least one positioning device and at least one camera is performed by performing trajectory alignment on the trajectories of the at least one lidar, at least one positioning device and at least one camera.

With the technical solution of the embodiment of the present disclosure, based on the data acquired by at least one lidar, at least one positioning device and at least one camera, the trajectory of each of the at least one lidar, at least one positioning device and at least one camera can be determined, and the joint calibration of a plurality of sensors can be achieved by performing trajectory alignment on the trajectories of a plurality of sensors. Thereby, the sensors are calibrated based on the data acquired by the plurality of sensors, which can maximize the utilization of multi-source information acquired, improve the precision of the sensor calibration, and simplify the calibration process of calibrating the plurality of sensors, and avoid the error accumulation introduced by calibration of two of the plurality of sensors.

Embodiment 3

Figure 3:
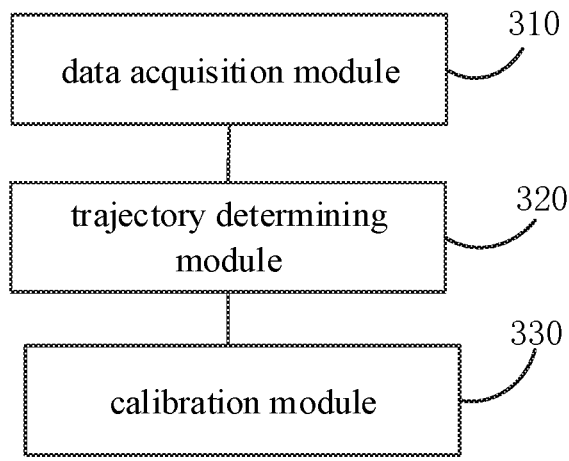
FIG. 3 is a block diagram of a multi-sensor calibration device according to Embodiment 3 of the present disclosure.

FIG. 3 is a block diagram of a multi-sensor calibration device according to Embodiment 3 of the present disclosure. The embodiment may be applicable to the case of calibrating a plurality of sensors simultaneously. The device may be implemented by means of software and/or hardware, and can be integrated on a computer device. The computer device may be configured on a vehicle, such as an unmanned vehicle with control and computing capabilities.

As shown in FIG. 3, the device includes a data acquisition module 310, a trajectory determining module 320, and a calibration module 330. The data acquisition module 310 is configured to acquire data acquired by each of at least three sensors in a same time period in a traveling process of a vehicle. The trajectory determining module 320 is configured to determine a trajectory of each of the at least three sensors according to the data acquired by each of at least three sensors. The calibration module 330 is configured to perform a joint calibration on the at least three sensors by performing trajectory alignment on the trajectories of the at least three sensors.

In at least one embodiment, the at least three sensors include at least one lidar, at least one positioning device, and at least one camera.

The trajectory determining module 320 includes a lidar trajectory determining unit, a positioning device trajectory determining unit, and a camera trajectory determining unit. The lidar trajectory determining unit is configured to determine the trajectory of the lidar based on a position relationship between a plurality of point clouds acquired by the lidar at different time points. The positioning device trajectory determining unit is configured to determine the trajectory of the positioning device based on a plurality of positioning points acquired by the positioning device at different time points. The camera trajectory determining unit is configured to determine the trajectory of the camera based on a position relationship between a plurality of images acquired by the camera at different time points.

In at least one embodiment, the lidar trajectory determining unit is configured to: analyze the plurality of point clouds acquired by the lidar at different time points; perform feature extraction on the plurality of point clouds; determine a position relationship between every two of the plurality of point clouds by feature alignment; and determine the trajectory of the lidar based on the position relationship.

In at least one embodiment, the camera trajectory determining unit includes an image feature point determining sub-unit, and a camera trajectory determining sub-unit. The image feature point determining sub-unit is configured to analyze the plurality of images acquired by the camera at different time points, obtain a plurality of feature points on each of the plurality of images, and determine a coordinate of each of the plurality of feature points in a camera coordinate system. The camera trajectory determining sub-unit is configured to determine a position relationship between every two of the plurality of images by feature point alignment, and determine the trajectory of the camera according to the position relationship.

In at least one embodiment, the calibration module 330 includes a trajectory distinguishing unit, and an extrinsic parameter determining unit. The trajectory distinguishing unit is configured to select one from the trajectories of the at least three sensors as a target trajectory, and take remaining trajectories as object trajectories. The extrinsic parameter determining unit is configured to perform trajectory alignment of each of the object trajectories and the target trajectory, and determine an extrinsic parameter of each of the at least three sensors in response to determining that each of the object trajectories is aligned with the target trajectory.

The multi-sensor calibration device provided by the embodiment of the present disclosure can perform the multi-sensor calibration method provided by any embodiment of the present disclosure, and has the corresponding functional modules for executing the method, and can achieve corresponding beneficial effects.

Embodiment 4

Figure 4:
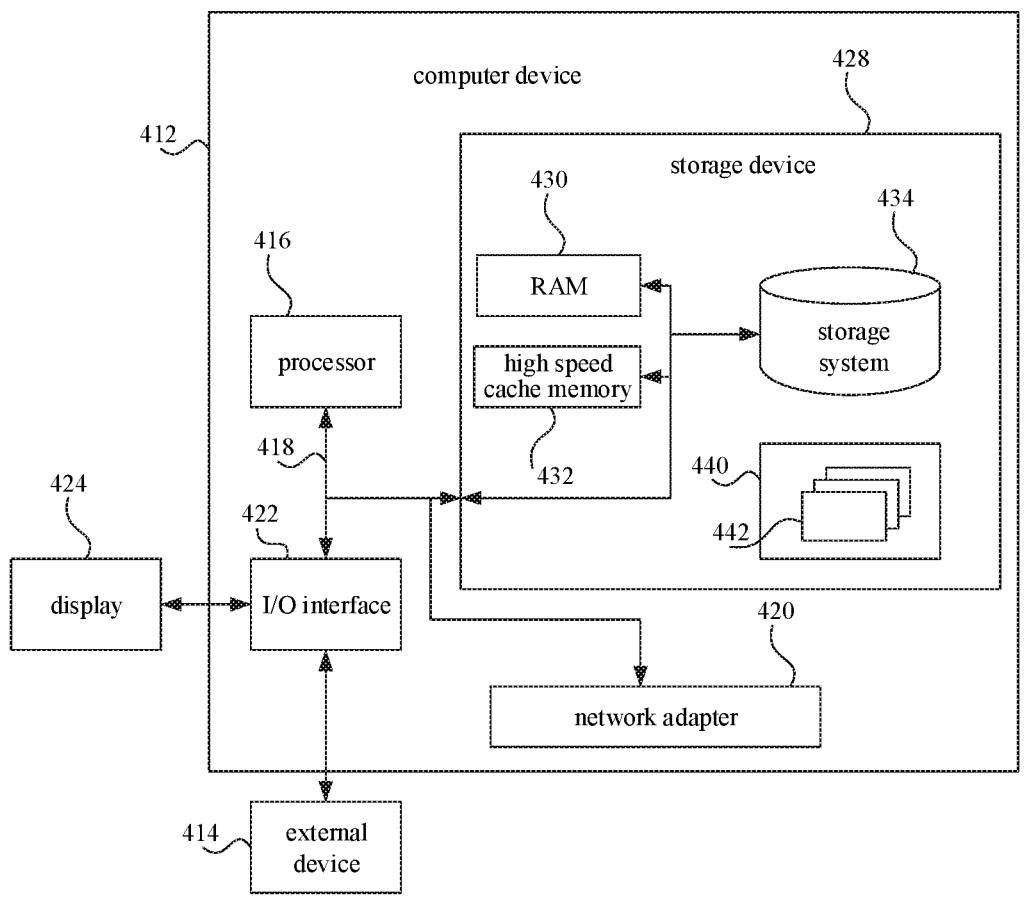
FIG. 4 is a schematic diagram of a computer device according to Embodiment 4 of the present disclosure.

FIG. 4 is a schematic diagram of a computer device according to Embodiment 4 of the present disclosure. FIG. 4 illustrates a block diagram of a computer device 412 suitable for implementing embodiments of the present disclosure. The computer device 412 shown in FIG. 4 is merely an example, and should not impose any limitation to the functions and scopes of embodiments of the present disclosure.

As shown in FIG. 4, the computer device 412 may be embodied in the form of a general-purpose computing device. Components of the computer device 412 may include, but are not limited to, one or more processors 416, a storage device 428, and a bus 418 that connects different components (including the storage device 428 and the processor 416).

The bus 418 represents one or more of any of several types of bus structures, including a memory bus or a memory controller, a peripheral bus, an accelerated graphics port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The computer device 412 typically includes a variety of computer system readable media. These media may be any available media accessible by the computer device 412, including volatile and non-volatile media, removable and non-removable media.

The storage device 428 may include a computer system readable medium in the form of volatile memory, such as a random-access memory (hereinafter referred to as RAM) 430 and/or a high-speed cache memory 432. The computer device 412 may further include other removable or non-removable, volatile or non-volatile computer system storage medium. By way of example only, the storage system 434 may be configured to read and write non-removable and non-volatile magnetic media (not shown in FIG. 4, commonly referred to as a "hard drive"). Although not shown in FIG. 4, a magnetic disk driver for reading from and writing to a removable and non-volatile magnetic disk (such as "floppy disk") and a disk driver for reading from and writing to a removable and non-volatile optical disk, such as compact disk read only memory (hereinafter referred to as CD-ROM), a digital video disc read only memory (hereinafter referred to as DVD-ROM) or other optical media can be provided. In these cases, each driver may be connected to the bus 418 via one or more data medium interfaces. The storage device 428 may include at least one program product. The program product has a set of (such as, at least one) program modules configured to perform the functions of various embodiments of the present disclosure.

A program/utility 440 having a set of (at least one) the program modules 442 may be stored in, for example, the storage device 428. The program module 442 may include, but is not limited to, an operating system, one or more application programs, other programs modules and program data. Each of these examples, or some combination thereof, may include an implementation of a network environment.

The program module 442 is generally configured to perform functions and/or methods in embodiments of the present disclosure.

The computer device 412 may also communicate with one or more external devices 414 (e.g., a keyboard, a pointing device, a camera, a display 424). Furthermore, the computer device 412 may also communicate with one or more devices enabling a user to interact with the computer device 412 and/or other devices (such as a network card, a modem, etc.) enabling the computer device 412 to communicate with one or more computer devices. This communication can be performed via the input/output (I/O) interface 422. Also, the computer device 412 may communicate with one or more networks, such as a local area network (hereinafter referred to as LAN), a wide area network (hereinafter referred to as WAN) and/or a public network such as the Internet) through a network adapter 420. As shown in FIG. 4, the network adapter 420 communicates with other modules of the computer device 412 over the bus 418. It should be understood that, although not shown in FIG. 4, other hardware and/or software modules may be used in conjunction with the computer device 412, which include, but are not limited to, microcode, device drivers, redundant processing units, external disk drive arrays, RAID systems, tape drives, as well as data backup storage systems and the like.

The processor 416 is configured to execute various functional applications and data processing by running a program stored in the storage device 428, for example, to implement the multi-sensor calibration method provided by the above-described embodiments of the present disclosure. The method includes: acquiring data acquired by each of at least three sensors in a same time period in a traveling process of a vehicle; determining a trajectory of each of the at least three sensors according to the data acquired by each of at least three sensors; and performing a joint calibration on the at least three sensors by performing trajectory alignment on the trajectories of the at least three sensors.

Embodiment 5

Embodiment 5 of the present disclosure further provides a computer storage medium having stored thereon a computer program that, when executed by a processor, causes the multi-sensor calibration method according to any embodiment of the present disclosure to be implemented. The method includes: acquiring data acquired by each of at least three sensors in a same time period in a traveling process of a vehicle; determining a trajectory of each of the at least three sensors according to the data acquired by each of at least three sensors; and performing a joint calibration on the at least three sensors by performing trajectory alignment on the trajectories of the at least three sensors.

The above non-transitory computer readable storage medium may adopt any combination of one or more computer readable medium(s). The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. More specific examples (a non-exhaustive list) of the computer readable storage medium include: an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by or in connection with an instruction executed system, apparatus or device.

The computer readable signal medium may include a data signal propagating in baseband or as part of carrier wave, which carries computer readable program codes. Such propagated data signal may take any of a variety of forms, including but not limited to an electromagnetic signal, an optical signal, or any suitable combination thereof. The computer readable signal medium may also be any computer readable medium other than the computer readable storage medium, which may send, propagate, or transport programs used by or in connection with an instruction executed system, apparatus or device.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object-oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereinafter referred as to LAN) or a Wide Area Network (hereinafter referred as to WAN).

Embodiment 6

Embodiment 6 of the present disclosure provide a vehicle. The vehicle includes a vehicle body, the computer device according to an embodiment of the present disclosure, and at least three sensors disposed on the vehicle body. The at least three sensors include at least two of a lidar, a camera, and a positioning device, the at least three sensors communicate with the computer device.

The location of the sensor on the vehicle body can be set according to the design of the vehicle. The vehicle may be an unmanned vehicle with control and computing capabilities. In the traveling process of the vehicle, after different sensors acquire data, they may send the data to the computer device, such that the computer device can perform data processing, such as perform joint calibration of different sensors.

The above are only the preferred embodiments of the present disclosure and the technical principles applied thereto. Those skilled in the art will appreciate that the present disclosure is not limited to the specific embodiments described herein, and that various modifications, changes and substitutions may be made without departing from the scope of the present disclosure. Although the present disclosure has been described in detail by the above embodiments, the present disclosure is not limited to the above embodiments, and other equivalent embodiments may be included without departing from the scope of the present disclosure, and the scope of the present disclosure is determined by the scope of the appended claims.

What is claimed is:

1. A multi-sensor calibration method, comprising:
   acquiring data acquired by each of at least three sensors in a same time period in a traveling process of a vehicle;
   determining a trajectory of each of the at least three sensors according to the data acquired by each of at least three sensors; and
   performing a joint calibration on the at least three sensors by performing trajectory alignment on the trajectories of the at least three sensors,
   wherein performing the joint calibration on the at least three sensors by performing trajectory alignment on the trajectories of the at least three sensors comprises:
   selecting one from the trajectories of the at least three sensors as a target trajectory, and taking remaining trajectories as object trajectories; and
   performing trajectory alignment of each of the object trajectories and the target trajectory, and determining an extrinsic parameter of each of the at least three sensors in response to determining that each of the object trajectories is aligned with the target trajectory.

2. The multi-sensor calibration method according to claim 1, wherein the at least three sensors comprise at least one lidar, at least one positioning device, and at least one camera;
   the trajectory of the lidar is determined based on a position relationship between a plurality of point clouds acquired by the lidar at different time points;
   the trajectory of the positioning device is determined based on a plurality of positioning points acquired by the positioning device at different time points;
   the trajectory of the camera is determined based on a position relationship between a plurality of images acquired by the camera at different time points.

3. The multi-sensor calibration method according to claim 2, wherein determining the trajectory of the lidar comprises:
   analyzing the plurality of point clouds acquired by the lidar at different time points;
   performing feature extraction on the plurality of point clouds;
   determining a position relationship between every two of the plurality of point clouds by feature alignment; and
   determining the trajectory of the lidar based on the position relationship.

4. The multi-sensor calibration method according to claim 2, wherein determining the trajectory of the camera comprises:
   analyzing the plurality of images acquired by the camera at different time points, and obtaining a plurality of feature points on each of the plurality of images;
   determining a coordinate of each of the plurality of feature points in a camera coordinate system;
   determining a position relationship between every two of the plurality of images by feature point alignment; and
   determining the trajectory of the camera according to the position relationship.

5. A multi-sensor calibration device, comprising:
   one or more processors;
   a storage device, configured to store one or more programs,
   wherein when the one or more programs are executed by the one or more processors, the one or more processors are caused to:
   acquire data acquired by each of at least three sensors in a same time period in a traveling process of a vehicle;
   determine a trajectory of each of the at least three sensors according to the data acquired by each of at least three sensors; and
   perform a joint calibration on the at least three sensors by performing trajectory alignment on the trajectories of the at least three sensors,
   wherein in performing the joint calibration on the at least three sensors by performing trajectory alignment on the trajectories of the at least three sensors, the one or more processors are configured to:
   select one from the trajectories of the at least three sensors as a target trajectory, and take remaining trajectories as object trajectories; and
   perform trajectory alignment of each of the object trajectories and the target trajectory, and determine an extrinsic parameter of each of the at least three sensors in response to determining that each of the object trajectories is aligned with the target trajectory.

6. The multi-sensor calibration device according to claim 5, wherein the at least three sensors comprise at least one lidar, at least one positioning device, and at least one camera;
   the one or more processors are configured to:
   determine the trajectory of the lidar based on a position relationship between a plurality of point clouds acquired by the lidar at different time points;
   determine the trajectory of the positioning device based on a plurality of positioning points acquired by the positioning device at different time points; and
   determine the trajectory of the camera based on a position relationship between a plurality of images acquired by the camera at different time points.

7. The multi-sensor calibration device according to claim 6, wherein in determining the trajectory of the lidar, the one or more processors are configured to:
   analyze the plurality of point clouds acquired by the lidar at different time points;
   perform feature extraction on the plurality of point clouds;
   determine a position relationship between every two of the plurality of point clouds by feature alignment; and
   determine the trajectory of the lidar based on the position relationship.

8. The multi-sensor calibration device according to claim 6, wherein in determining the trajectory of the camera, the one or more processors are configured to:
   analyze the plurality of images acquired by the camera at different time points, and obtain a plurality of feature points on each of the plurality of images;
   determine a coordinate of each of the plurality of feature points in a camera coordinate system;
   determine a position relationship between every two of the plurality of images by feature point alignment; and
   determine the trajectory of the camera according to the position relationship.

9. A non-transitory computer readable storage medium having stored thereon a computer program that, when executed by a processor, causes a multi-sensor calibration method to be implemented, the method comprising:
   acquiring data acquired by each of at least three sensors in a same time period in a traveling process of a vehicle;
   determining a trajectory of each of the at least three sensors according to the data acquired by each of at least three sensors; and
   performing a joint calibration on the at least three sensors by performing trajectory alignment on the trajectories of the at least three sensors, wherein performing the joint calibration on the at least three sensors by performing trajectory alignment on the trajectories of the at least three sensors comprises:
selecting one from the trajectories of the at least three sensors as a target trajectory, and taking remaining trajectories as object trajectories; and
performing trajectory alignment of each of the object trajectories and the target trajectory, and determining an extrinsic parameter of each of the at least three sensors in response to determining that each of the object trajectories is aligned with the target trajectory.

10. The non-transitory computer readable storage medium according to claim 9, wherein the at least three sensors comprise at least one lidar, at least one positioning device, and at least one camera;
the trajectory of the lidar is determined based on a position relationship between a plurality of point clouds acquired by the lidar at different time points;
the trajectory of the positioning device is determined based on a plurality of positioning points acquired by the positioning device at different time points;
the trajectory of the camera is determined based on a position relationship between a plurality of images acquired by the camera at different time points.

11. The non-transitory computer readable storage medium according to claim 10, wherein determining the trajectory of the lidar comprises:
analyzing the plurality of point clouds acquired by the lidar at different time points;
performing feature extraction on the plurality of point clouds;
determining a position relationship between every two of the plurality of point clouds by feature alignment; and
determining the trajectory of the lidar based on the position relationship.

12. The non-transitory computer readable storage medium according to claim 10, wherein determining the trajectory of the camera comprises:
analyzing the plurality of images acquired by the camera at different time points, and obtaining a plurality of feature points on each of the plurality of images;
determining a coordinate of each of the plurality of feature points in a camera coordinate system;
determining a position relationship between every two of the plurality of images by feature point alignment; and
determining the trajectory of the camera according to the position relationship.

* * * * *